US006697802B2

(12) United States Patent
Ma et al.

(10) Patent No.: US 6,697,802 B2
(45) Date of Patent: Feb. 24, 2004

(54) SYSTEMS AND METHODS FOR PAIRWISE ANALYSIS OF EVENT DATA

(75) Inventors: Sheng Ma, Briarcliff Manor, NY (US); Genady Grabarnik, Briarcliff Manor, NY (US); Joseph L. Hellerstein, Ossining, NY (US); Chang-Shing Perng, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 09/976,574

(22) Filed: Oct. 12, 2001

(65) Prior Publication Data

US 2003/0097367 A1 May 22, 2003

(51) Int. Cl.[7] .............................................. G06F 17/00
(52) U.S. Cl. .................................. 707/6; 707/10; 707/4; 707/5
(58) Field of Search ..................... 707/1–10, 100–104.1, 707/200–206; 709/200–218

(56) References Cited

U.S. PATENT DOCUMENTS 6,571,279 B1 * 5/2003 Herz et al. ..................... 707/10
6,572,662 B2 * 6/2003 Manohar et al. ............... 707/10
6,578,028 B2 * 6/2003 Egilsson et al. ................ 707/2

OTHER PUBLICATIONS

Park et al., Using a hash–based method with transaction trimming for mining association rules, Knowledge and Data Engineering, IEEE Transactions on, vol. 9, Issue 5, Sep./Oct. 1997, pp. 813–825.*
Chang et al., Mining general temporal association rules for items with different exhibition periods, Data Mining , 2002, Proceedings, 2002, IEEE International Conference on, 2002, pp. 59–66.*
Zou et al., A pattern decomposition (PD) algorithim for finding all frequent patterns in large datasets, Data Mining, 2001, ICDM 2001, Proceedings IEEE International Conference on, 2001, pp. 673–674.*
U.S. patent application Ser. No. 09/918,253, filed Jul. 30, 2001, "Systems and Methods for Discovering Mutual Dependence Patterns".
U.S. patent application Ser. No. 09/929,883, filed Aug. 15, 2001, "Systems and Methods for Discovering Fully Dependent Patterns".
U.S. patent application Ser. No. 09/860,154, filed May 17, 2001, "Systems and Methods for Identifying and Counting Instances of Temporal Patterns".
U.S. patent application Ser. No. 09/976,540, filed Oct. 12, 2001, "Systems and Methods for Providing Off–Line Decision Support for Correlation Analysis".
U.S. patent application Ser. No. 09/976,543, filed Oct. 12, 2001, "Systems and Methods for Validation, Completion and Construction of Event Relationship Networks".
R. Agrawal et al., "Mining Association Rules Between Sets of Items in Large Databases," Proc. of VLDB, pp. 207–216, 1993.
K.R. Milliken et al., "YES/MVS and the Automation of Operations for Large Computer Complexes," IBM Systems Journal, vol. 25, No. 2, 1986.

* cited by examiner

Primary Examiner—David Jung
(74) Attorney, Agent, or Firm—Gail H. Zarick; Ryan, Mason & Lewis, LLP

(57) ABSTRACT

Techniques for mining or discovering one or more patterns in an input data set, wherein the input data set is characterized by attributes, comprises the following steps. First, the technique includes mapping attributes of the input data set to mapping values. Then, one or more candidate patterns are formed as groupings of two mapping values that occur within a predefined time period. Next, for each of the one or more candidate patterns, a qualification function is computed and a result of the qualification function is compared with at least one predefined threshold value. The one or more candidate patterns whose qualification function results are greater than or equal to the predefined threshold value are identified as one or more qualified patterns.

25 Claims, 10 Drawing Sheets

FIG. 5

DB DESCRIPTION
<StringParameter name="DBName" type="string" defaultValue="EBM1"/>
<StringParameter name="UserName" type="string" defaultValue="em"/>  } 502
<StringParameter name="Password" type="string" defaultValue="em1234"/>

SQL DATA DESCRIPTION
<StringParameter name="inSQL" type="string" defaultValue="SELECT SOURCE,TIMESTAMP(date,time) } 504
TIME,EVENTTYPE,HOST,SEVERITY FROM EM.EMBTECM100"/>

FIG. 6

MAPPINGS
<DefaultFields>
  <Field name="EVENTTYPE"/>
  <Field name="SEVERITY"/>
</DefaultFields>                                    } 602
<DefaultKeys>
  <Field name="HOST"/>
</DefaultKeys>

THRESHOLDS
:NumberParameter name="windowSize" type="long" defaultValue="3000" minValue="0" maxValue="3000"/>
<NumberParameter name="countThreshold" type="long" defaultValue="0" minValue="0" maxValue="300"/>
<NumberParameter name="pThreshold" type="float" defaultValue="0.0" minValue="0.0" maxValue="1.0"/>   } 604
<NumberParameter name="p2Threshold" type="float" defaultValue="0" minValue="0" maxValue="1.0"/>
<NumberParameter name="scoreThreshold" type="float" defaultValue="0" minValue="0" maxValue="9999"/>

FIG. 7 params
| | | |
|---|---|---|
| params_id | INTEGER | \<pk\> |
| algo_id | INTEGER | |
| param_id | INTEGER | \<pk\> |
| name | VARCHAR(60) | |
| val | VARCHAR(60) | |
| param_type | INTEGER | | patterns
| | | |
|---|---|---|
| patterns_id | INTEGER | \<pk\> |
| algo_id | INTEGER | \<pk\> |
| pattern_desc_id | INTEGER | | refs
| | | |
|---|---|---|
| refs_id | INTEGER | \<pk\> |
| event_group_id | INTEGER | \<pk\> |
| algo_id | INTEGER | \<pk\> | event_group
| | | |
|---|---|---|
| algo_id | INTEGER | \<pk\> |
| event_group_id | INTEGER | \<pk\> |
| val | VARCHAR(60) | |
| id | INTEGER | \<pk\> | algo_run
| | |
|---|---|
| algo_id | INTEGER |
| name | VARCHAR(60) |
| run_date | VARCHAR(60) |
| run_time | VARCHAR(60) |
| params_id | INTEGER |
| patterns_id | INTEGER |
| map_id | INTEGER |
| event_groups_id | INTEGER |
| data_source | VARCHAR(254) | pattern_desc
| | | |
|---|---|---|
| patterns_id | INTEGER | \<pk\> |
| pattern_desc_id | INTEGER | |
| algo_id | INTEGER | \<pk\> |
| stat_desc_id | INTEGER | | pattern
| | | |
|---|---|---|
| pattern_id | INTEGER | \<pk\> |
| refs_id | INTEGER | |
| statistics_id | INTEGER | |
| patterns_id | INTEGER | \<pk\> |
| algo_id | INTEGER | \<pk\> | map
| | | |
|---|---|---|
| algo_id | INTEGER | \<pk\> |
| name | VARCHAR(60) | |
| field_type | INTEGER | |
| map_id | INTEGER | \<pk\> |
| id | INTEGER | \<pk\> | event_groups
| | | |
|---|---|---|
| event_groups_id | INTEGER | \<pk\> |
| algo_id | INTEGER | \<pk\> |
| event_group_id | INTEGER | \<pk\> | stat_desc
| | | |
|---|---|---|
| algo_id | INTEGER | \<pk\> |
| stat_desc_id | INTEGER | \<pk\> |
| name | VARCHAR(60) | |
| val | VARCHAR(60) | |
| param_type | INTEGER | |
| id | INTEGER | \<pk\> | statistics
| | | |
|---|---|---|
| statistics_id | INTEGER | \<pk\> |
| val | VARCHAR(60) | |
| id | INTEGER | \<pk\> |
| param_type | INTEGER | |

FIG. 9

| | A | B | C | D | E | F | G |
|---|---|---|---|---|---|---|---|
| | Event_StatusName1 | Event_StatusName2 | Count | P(1\|2) | P(2\|1) | Pm | Chi-sc |
| 1 | USAA_NV_clogSevMinor.OPEN | USAA_NV_clogSevMinor.CLOSED | 270 | 1 | 1 | 1 | 17797 |
| 2 | USAA_NV_SYSLOG_RSP_SLAVECHANGE.ACK | USAA_NV_SYSLOG_RSP_SLAVECHANGE.C | 15 | 1 | 1 | 1 | 18299 |
| 3 | USAA_Tandem.OPEN | USAA_Tandem.CLOSED | 565 | 0.998 | 0.998233 | 0.998233 | 17168 |
| 4 | USAA_SA390.OPEN | USAA_SA390.CLOSED | 7967 | 0.998 | 0.999373 | 0.997746 | 7174. |
| 5 | Distribution_Start.na | Dist_Successful.na | 1124 | 0.992 | | 0.992056 | 16065 |
| 6 | PATROL_MSEXCH_Directory.OPEN | PATROL_MSEXCH_Directory.CLOSED | 8 | 0.889 | 1 | 0.888889 | 16276 |
| 7 | USAA_NV_HSRP_Deleted.CLOSED | USAA_NV_HSRP_Deleted.OPEN | 920 | 0.934 | 0.879541 | 0.879541 | 13314 |
| 8 | USAA_Host_StateUnknown.OPEN | USAA_Host_StateUnknown.CLOSED | 4192 | 0.841 | 0.934463 | 0.84126 | 7761. |
| 9 | PATROL_USAA_NT_RPC.OPEN | PATROL_USAA_NT_RPC.CLOSED | 121 | 0.834 | 0.896296 | 0.834483 | 13469 |
| 10 | USAA_Host_OservUnresponsive.OPEN | USAA_Host_OservUnresponsive.CLOSED | 1459 | 0.789 | 0.907338 | 0.788649 | 10452 |
| 11 | TEC_Stop.na | TEC_Start.na | 29 | 0.967 | 0.783784 | 0.783784 | 13829 |
| 12 | USAA_NV_C5000_PS1_Major.OPEN | USAA_NV_C5000_PS1_Major.CLOSED | 561 | 0.775 | 0.942857 | 0.774862 | 12308 |
| 13 | USAA_Host_Inaccessible.OPEN | USAA_Host_Inaccessible.CLOSED | 1892 | 0.765 | 0.82476 | 0.764753 | 8225. |
| 14 | USAA_NV_Cisco_Link_Down.CLOSED | USAA_NV_Cisco_Link_Down.OPEN | 5539 | 0.814 | 0.704439 | 0.704439 | 2797. |
| 15 | PATROL_NT_SERVICES.OPEN | PATROL_NT_SERVICES.CLOSED | 5176 | 0.645 | 0.743251 | 0.645226 | 1782. |
| 16 | USAA_NV_C5000_PS2_Major.CLOSED | USAA_NV_C5000_PS2_Major.OPEN | 298 | 0.849 | 0.635394 | 0.635394 | 9305. |
| 17 | USAA_NV_MLM_Down.OPEN | USAA_NV_MLM_Down.CLOSED | 207 | 0.603 | | 0.603499 | 7889. |
| 18 | PATROL_cpq_11.OPEN | PATROL_cpq_9.OPEN | 3 | 0.6 | 0.75 | 0.6 | 8242. |
| 19 | USAA_NV_Node_Down.OPEN | USAA_NV_Node_Down.CLOSED | 1045 | 0.568 | 0.700402 | 0.567626 | 5391. |
| 20 | PATROL_NT_LOGICAL_DISKS_T.OPEN | PATROL_NT_LOGICAL_DISKS_T.CLOSED | 29 | 0.527 | 0.58 | 0.527273 | 5547. |
| 21 | PATROL_NT_MEMORY_T.OPEN | PATROL_NT_MEMORY_T.CLOSED | 324 | 0.506 | 0.586957 | 0.50625 | 4822. |
| 22 | PATROL_MSEXCH_Server.OPEN | PATROL_MSEXCH_Server.CLOSED | 8 | 0.5 | 1 | 0.5 | 9148. |
| 23 | USAA_Host_Mtce.OPEN | USAA_Host_Mtce.CLOSED | 973 | 0.49 | 0.665982 | 0.48993 | 4229. |
| 24 | PATROL_USAA_NT_LOGICAL_DISKS.OPEN | PATROL_USAA_NT_LOGICAL_DISKS.CLOSE | 321 | 0.428 | 0.649798 | 0.428 | 4480. |
| 25 | USAA_Process_UNIX.OPEN | USAA_Process_UNIX.CLOSED | 77 | 0.425 | 0.777778 | 0.425414 | 59722 |
| 26 | PATROL_Srv_2019.CLOSED | PATROL_Srv_2021.CLOSED | 11 | 0.733 | 0.366667 | 0.366667 | 49005 |
| 27 | PATROL_Srv_2019.OPEN | PATROL_Srv_2021.OPEN | 11 | 0.733 | 0.366667 | 0.366667 | 49005 |

FIG. 10

| | A | B | C | D | E | F |
|---|---|---|---|---|---|---|
| 1 | Event_StatusName | Event_StatusName1 | Count | P(2|1) | P(1|2) | Pm |
| 2 | Dist_Successful.na | Distribution_Start.na | 1124 | 0.992 | 1 | 0.992056 |
| 3 | Dist_Successful.na | TEC_Start.na | 10 | 0.009 | 0.27027 | 0.008897 |
| 4 | Dist_Successful.na | TEC_Stop.na | 9 | 0.008 | 0.3 | 0.008007 |
| 5 | Dist_Successful.na Total | | 1143 | | | |
| 6 | Distribution_Start.na | Dist_Successful.na | 1124 | 0.992 | 1 | 0.992056 |
| 7 | Distribution_Start.na | TEC_Start.na | 11 | 0.01 | 0.297297 | 0.009709 |
| 8 | Distribution_Start.na | TEC_Stop.na | 10 | 0.009 | 0.333333 | 0.008826 |
| 9 | Distribution_Start.na Total | | 1145 | | | |
| 12 | PATROL_Application_Popup_26.CLOSED Total | | 872 | | | |
| 18 | PATROL_Application_Popup_26.OPEN Total | | 1022 | | | |
| 20 | PATROL_cqp_11.OPEN Total | | 3 | | | |
| 22 | PATROL_cqp_9.OPEN Total | | 3 | | | |
| 24 | PATROL_cpq32fs2_11.CLOSED Total | | 4 | | | |
| 26 | PATROL_cpq32fs2_11.OPEN Total | | 7 | | | |
| 29 | PATROL_FILESYSTEM.CLOSED Total | | 591 | | | |
| 33 | PATROL_FILESYSTEM.OPEN Total | | 727 | | | |
| 36 | PATROL_MSEXCH_Directory.CLOSED Total | | 16 | | | |
| 39 | PATROL_MSEXCH_Directory.OPEN Total | | 17 | | | |
| 42 | PATROL_MSEXCH_Server.CLOSED Total | | 13 | | | |
| 45 | PATROL_MSEXCH_Server.OPEN Total | | 18 | | | |
| 47 | PATROL_NetBT_4319.CLOSED Total | | 3 | | | |
| 49 | PATROL_NetBT_4319.OPEN Total | | 5 | | | |
| 51 | PATROL_NT_LOGICAL_DISKS_T.CLOSED Total | | 29 | | | |
| 54 | PATROL_NT_LOGICAL_DISKS_T.OPEN Total | | 38 | | | |
| 56 | PATROL_NT_MEMORY_T.CLOSED Total | | 324 | | | |
| 59 | PATROL_NT_MEMORY_T.OPEN Total | | 404 | | | |
| 62 | PATROL_NT_SERVICES.ACK Total | | 13 | | | |

SYSTEMS AND METHODS FOR PAIRWISE ANALYSIS OF EVENT DATA

FIELD OF THE INVENTION

The present invention relates generally to data processing techniques and, more particularly, to methods and apparatus for performing pairwise analysis of data.

BACKGROUND OF THE INVENTION

As it becomes feasible to collect large volumes of data, businesses are increasingly looking for ways to capitalize on this data, especially market data. Thus, such businesses turn toward data mining techniques. As is known, data mining seeks to discover interesting and previously unknown patterns or information from a large amount of historical data often stored in a database, e.g., market data. Specifically, one key aspect of data mining involves searching for significant patterns embedded in the data. A pattern generally refers to a set of items denoted as pat=$\{i_1, i_2, i_3, \ldots, i_k\}$, where $i_k$ is the k-th item. In accordance with the present invention, we focus on pairwise patterns, i.e., patterns with two items.

To discover item sets that are of interest, two issues need to be addressed and, very often, these two issues also need to be compromised. The first issue relates to defining what patterns we intend to discover, and determining the level of interest associated with a particular pattern. To this end, many measurements have been developed: (1) frequency of item sets; (2) association rules; (3) dependency test; (4) mutual dependence; and so on. One measurement or a combination of measurements is needed to describe significant patterns for a specific application. For example, a marketing application may target the general population in order to optimize a profile. Thus, in this case, the frequency of patterns is the key measurement, see, e.g., R. Agrawal et al., "Mining Association Rules Between Sets of Items in Large Databases," Proceeding of VLDB, pp. 207–216, 1993, and also see, e.g., an extension of R. Agrawal et al. in H. Mannila et al., "Discovery of Frequent Episodes in Event Sequences," Data Mining and Knowledge Discovery, Vol. 1, No. 3, 1997, the disclosures of which are incorporated by reference herein.

In system management or intrusion detection tasks, discovery of infrequent, but significant, patterns may be required. Such patterns have been described in U.S. patent applications identified as: Ser. No. 09/918,253, entitled "Systems and Methods for Discovering Mutual Dependence Patterns," and filed on Jul. 30, 2001; and Ser. No. 09/929,883, entitled "Systems and Methods for Discovering Fully Dependent Patterns," and filed on Aug. 15, 2001, the disclosures of which are incorporated by reference herein. In both applications, patterns of interest are ones that occur non-randomly. It is known that a statistical test can be used to test whether a pattern occurs randomly. As a result, it is desirable to use the statistical test together with other measurements.

The second issue associated with pattern discovery that needs to be addressed involves determining mechanisms for efficiently mining a large amount of data, wherein the data may not be fully loaded into main memory. In one extreme, each possible pattern may be exhaustively examined in order to find all patterns satisfying a defined qualification function. However, since there are a huge number of possible item sets (to be precise, $O(n^k)$, where n is the number of distinct items and k is the length of the item sets), such a brute-force approach is not reasonable, even for a moderate number of distinct items.

R. Agrawal et al. (in the above-referenced "Mining Association Rules Between Sets of Items in Large Databases" article) devised the so-called "Apriori" algorithm, and demonstrated that it is possible to discover all frequent item sets which are above a predefined minimum support (minsup). The Apriori algorithm searches item set space in a level-wise manner. At level k, the algorithm constructs candidate patterns with a length k based on qualified patterns in the previous level, and scans data to find all qualified patterns. This effectively prunes the search space. The reason that such an algorithm can be surprisingly effective in pruning the search space lies in the fact that the frequency (or support) has the downward closure property or, equivalently, the anti-monitone property. That is, if an item set is frequent above a threshold, then all its subsets are frequent above the threshold. Clearly, such an algorithm can be generalized to other qualification functions that are downward closed. Unfortunately, very few desired statistical qualification functions have such a downward closure property. For example, the confidence measure (e.g., predictive power) and the commonly-used dependency test do not satisfy this property.

So far, most previous work focused on discovering all patterns that satisfy a qualification condition that is downward closed. For example, frequent association patterns use the minsup as a qualification criterion. Other previous work defined mutual dependent patterns (m-patterns) and fully dependent patterns (d-patterns). An m-pattern requires that the mutual dependence of a pattern be above a threshold; while a d-pattern requires that all subsets of a pattern satisfy a dependency test.

However, the previous work has certain limitations. First, although a level-wise approach can significantly eliminate the pattern space, it is still computationally expensive to discover all patterns with any length, especially for long patterns. This is because all subsets of a pattern are qualified patterns. As a result, the algorithm needs to enumerate all the subsets. For example, a pattern with length 20 has more than $10^{30}$ qualified subpatterns, requiring enormous storage space and unrealistic computational time for a level-wise algorithm to discover such a pattern.

Second, to apply an efficient algorithm, a qualification measurement needs to have the downward closure property. Consequently, arbitrary conditions that are best for an application can not be designed. Many valuable measurements, such as predictive power and statistical testing, can not be applied in the mining process. Unfortunately, this results in missing many important patterns and discovering many false patterns.

Lastly, and most importantly, pattern discovery is an interactive and iterative process in which patterns found should be validated by domain experts before used in production. However, in practice, it is very difficult for humans to make sense of a long pattern because of the exponentially possible number of relationships of items. For example, in a pattern with three items, i.e., $\{a, b, c\}$, there can be many types of relationships: three items may be cascaded (e.g., a causes b and b causes c); two of the three items may trigger the third one (e.g., a and b cause c); and one item may trigger the other two (e.g., a causes b and c). Clearly, each type has many possible permutations. As a result, how to interpret a pattern with three or more items becomes a very difficult task for a domain expert.

SUMMARY OF THE INVENTION

The present invention provides techniques for mining or discovering two-item or pairwise patterns. Preferably, the pairwise patterns are mined or discovered from a large amount of temporal historical events.

In a first aspect of the invention, a technique for mining or discovering one or more patterns in an input data set, wherein the input data set is characterized by attributes, comprises the following steps. First, the technique includes mapping attributes of the input data set to mapping values. Then, one or more candidate patterns are formed as groupings of two mapping values that occur within a predefined time period. Next, for each of the one or more candidate patterns, a qualification function is computed and a result of the qualification function is compared with at least one predefined threshold value. The one or more candidate patterns whose qualification function results are greater than or equal to the predefined threshold value are identified as one or more qualified patterns.

In a second aspect of the invention, the mapping step comprises mapping attributes of at least two types associated with the input data set to item values, and forming one or more candidate patterns as groupings of two item values that occur within a predefined time period. When the input data set comprises event data, the at least two attribute types are an event type and an event source identifier. This mapping corresponds to inter-host mapping.

In a third aspect of the invention, the mapping step comprises mapping attributes of at least one type associated with the input data set to item values, mapping attributes of at least another type associated with the input data set to key values, and forming one or more candidate patterns as groupings of two item values that are associated with the same key value and occur within a predefined time period. When the input data set comprises event data, the at least one attribute type is an event type and the at least another attribute type is an event source identifier. This mapping corresponds to intra-host mapping.

In a fourth aspect of the present invention, the qualification function may comprise one or more significance measurements such as an occurrence count, a predictive power measure, a mutual dependence measure, a correlation score, and a chi-squared score. Still further, the mapping values (e.g., item values and key values), qualification function, and the threshold value are preferably specified by a user.

In a fifth aspect of the present invention, the one or more qualified patterns may be visualized. The visualizations may comprise lists and/or graphical representations. By way of one graphical representation, a qualified pattern may be visually presented to a user by nodes representing at least one of the attributes of the input data set and a link connecting the nodes representing that the nodes form a qualified pattern. The link may be visually encoded to represent the result of the qualification function. Also, the node may be visually encoded to represent a measure e.g., an occurrence count, associated with a corresponding attribute.

In a sixth aspect of the present invention, the qualified patterns may be summarized to reveal multi-item relationships. The summarizing operation may comprise grouping qualified patterns having at least one identical mapping value (e.g., item value) into a group. Alternatively, the summarizing operation may comprise merging qualified patterns into one or more higher order patterns.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a diagram illustrating a database description in Extensible Markup Language (XML) format according to an embodiment of the present invention;

FIG. 6 is a diagram illustrating a mapping and analysis description in XML format according to an embodiment of the present invention;

FIG. 7 is a diagram illustrating a pattern schema according to an embodiment of the present invention;

FIG. 9 is a diagram illustrating a list of significant pairwise patterns according to an embodiment of the present invention;

FIG. 10 is a diagram illustrating a simple summarization according to an embodiment of the present invention.

DETAILED DESCRIPTION OF PREFERRED EMBODIMENTS

Figure 1:
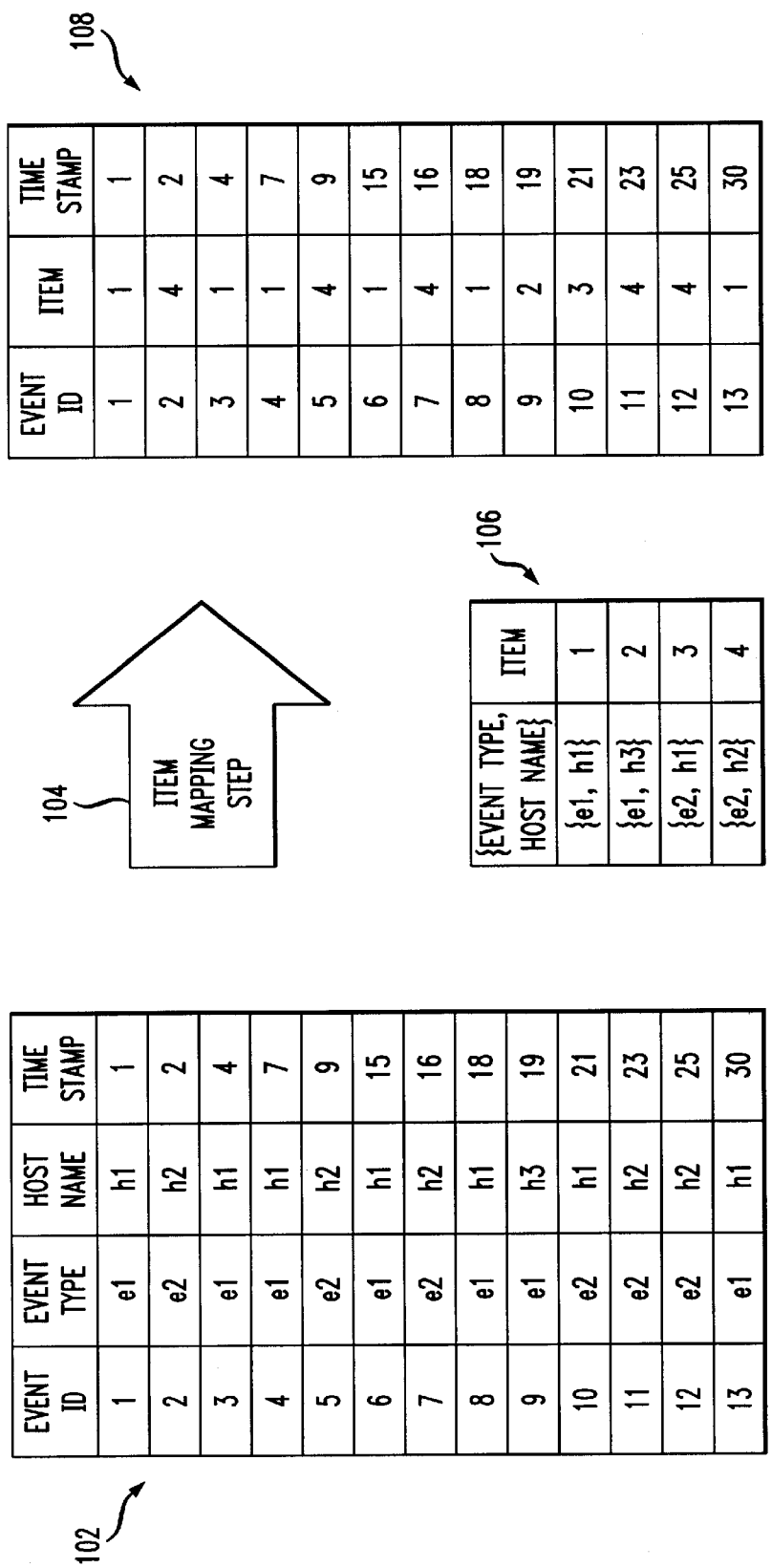
FIG. 1 is a diagram illustrating an exemplary inter-host mapping in which two attributes are mapped to an item according to an embodiment of the present invention.

The present invention provides techniques for mining or discovering significant pairwise patterns. As will be evident, the term "significant" refers to pairwise patterns which result in measurements values that are at or above one or more predefined threshold values. Preferably, such pairwise patterns may be mined or discovered from a large amount of temporal historical events. The technique focuses on the analysis of pairwise patterns by preferably using a combination of significance measurements. Once a pairwise relationship is understood, k-item patterns can be derived through merging related pairwise patterns visually or algorithmically. It is to be noted that there are at most $k^2$ pairwise patterns, where k is the number of items. The present invention realizes that efficiency is achieved even by enumerating every possible pairwise pattern and checking a user-defined qualification function. As a result, in accordance with an aspect of the invention, a qualification condition is provided that combines multiple qualification conditions and that is used in order to discover all significant pairwise patterns that are of interest to a specific application.

After significant pairwise patterns are obtained, the relationship of pairwise patterns may be further analyzed through both a graphical approach and a summarization approach. This further allows for the grouping of pairwise patterns effectively so as to reveal multi-item relationships. For example, a diagram can be drawn in which nodes represent items and links between nodes represent the relationship of the two connected end nodes. In practice, this visualization is extremely powerful so as to enable a human to understand the relationships of items.

Further, the methodologies of the present invention may be applied to event data, in which each event is often represented by multiple attributes such as a host name of the originator of the event, an event type, and time stamp. A severity level associated with the event may be an additional attribute. Such event data is very common in applications such as, for example, alarms generated by telecommunication systems or computer systems, alarms related to intrusion detection, an access log of a computer server (e.g., Web server, mail server, and so on). Events produced by different applications may be different in the number of attributes as well as the types of attributes.

It is known that conventional data mining frameworks can not address multiple attributes naturally. Thus, the present invention introduces a mapping scheme that maps event attributes to an "item" value and a "key" value. An item is a generic attribute used to name a data object. A key is a concept introduced to group events. Through different mappings, different types of patterns are defined. For example, in mining event logs for a system management task, one is often interested in two types of patterns called: "intra-host patterns" and "inter-host patterns." An exemplary intra-host pattern is that a "port down" event is often followed by a "port up" event from the same router. This pattern indicates a reboot operation typically follows the failure of a router. An exemplary inter-host pattern is that a port down event from host A is often followed by a link down event from host B. Clearly, an intra-host event pattern characterizes a relationship of two event types originated from the same host; while an inter-host event pattern characterizes correlation across hosts.

Accordingly, in one illustrative embodiment of the invention, a computer-based system for mining pairwise patterns is operative to: (1) enable a user to define mappings for items and keys; (2) enable a user to define a qualification function and thresholds; (3) scan event data and discover all pairwise patterns that satisfy a defined "interestingess" measurement; (4) store qualified pairwise patterns in a database; and (5) enable a user to then review and analyze patterns by summarizing and visualizing pairwise patterns through one or more graphical user interfaces. The present invention realizes that data analysis is an inherently interactive process. Thus, the present invention provides for the interaction with a user in step (5) to result in new definitions in step (1) and step (2), thus leading to a new analysis.

The present invention will be described below in the context of an exemplary application of mining event data in a system management application. However, it is to be understood that the invention is not limited to use with a particular application domain but is rather more generally applicable for use in accordance with any application domain (e.g., systems management, process control, manufacturing, to name a few examples) in which it is desirable to provide a determination of significant pairwise patterns in data, generated in accordance with the application domain.

The remainder of the detailed description will be structured as follows. First, notations and examples will be provided to illustrate the concepts of pairwise patterns and to illustrate preferred significance measurements of pairwise patterns, according to various embodiments of the present invention. Second, the detailed description will provide an illustrative system for mining pairwise patterns and describe algorithms employed in the system, according to various embodiments of the present invention.

We start with notations. The left-hand side tables in FIG. 1 and FIG. 2, denoted as 102 and 202, respectively, illustrate alarms in a computer system management application. Each row of the two examples corresponds to an alarm (denoted by an event ID). The columns represent the attributes of an alarm. In our example, an alarm (or event) has multiple attributes: (1) an event ID identifying each individual alarm; (2) a host name identifying the origin of the alarm; (3) an event type identifying the type of event; and (4) a time stamp identifying the time of the event.

In accordance with an embodiment of the present invention, a temporal pattern is a set of items that have the same key value and occur within a time window w. Here, the terms item and key represent generic names. Their values are mapped from one or more attribute values of the original attributes. More particularly, in this embodiment, items are used to name an event and define the content of a pattern; while key values define how items are grouped together as instances of patterns. Put differently, an instance of a pattern requires all items in the instance having the same key value.

We consider two types of mappings in mining alarm logs for the system management application. The first mapping operation maps or translates a pair comprising an event type and a host name to an item value and leaves the key value empty. An exemplary pattern is one that specifies that "link$_{13}$ down of host A" and "node$_{13}$ down of host B" often occur together. This type of mapping provides correlation across different hosts and is referred to as inter-host mapping.

FIG. 1 is a diagram illustrating an exemplary inter-host mapping in which two attributes are mapped to an item according to an embodiment of the present invention. More particularly, FIG. 1 illustrates the situation where combinations of host names and event types are mapped to item values. As is evident, there is no mapping of key values. Thus, table 102 shows the input data to the mapping process; table 108 shows the output data of the mapping process; and table 106 is the mapping table that translates each pair comprising a host name and an event type into an item value.

For example, as shown in FIG. 1, host name h1 and event type e1 are mapped to item 1; while host name h3 and event type e1 are mapped to item 2. Thus, an example of a pairwise pattern may be the item set {1, 2}. That is, a pairwise pattern may be identified as event type e1 occurring at host name h1 and event type e1 occurring at host name h3. For a time window w of size 2 for a pattern to occur within, there is one instance of {1, 2} which contains the 8th and 9th events in the data. It is to be understood that such 8th and 9th events in the data correspond to the time stamps 18 and 19, which fall within a time window of 2.

The second type of mapping translates an event type to an item value and a host name to a key value. An exemplary pattern is one that specifies that "link_up" and "link_down" from the same host often occur together. This type of mapping characterizes a relationship of two event types originated from the same host and is referred to as intra-host mapping.

Figure 2:
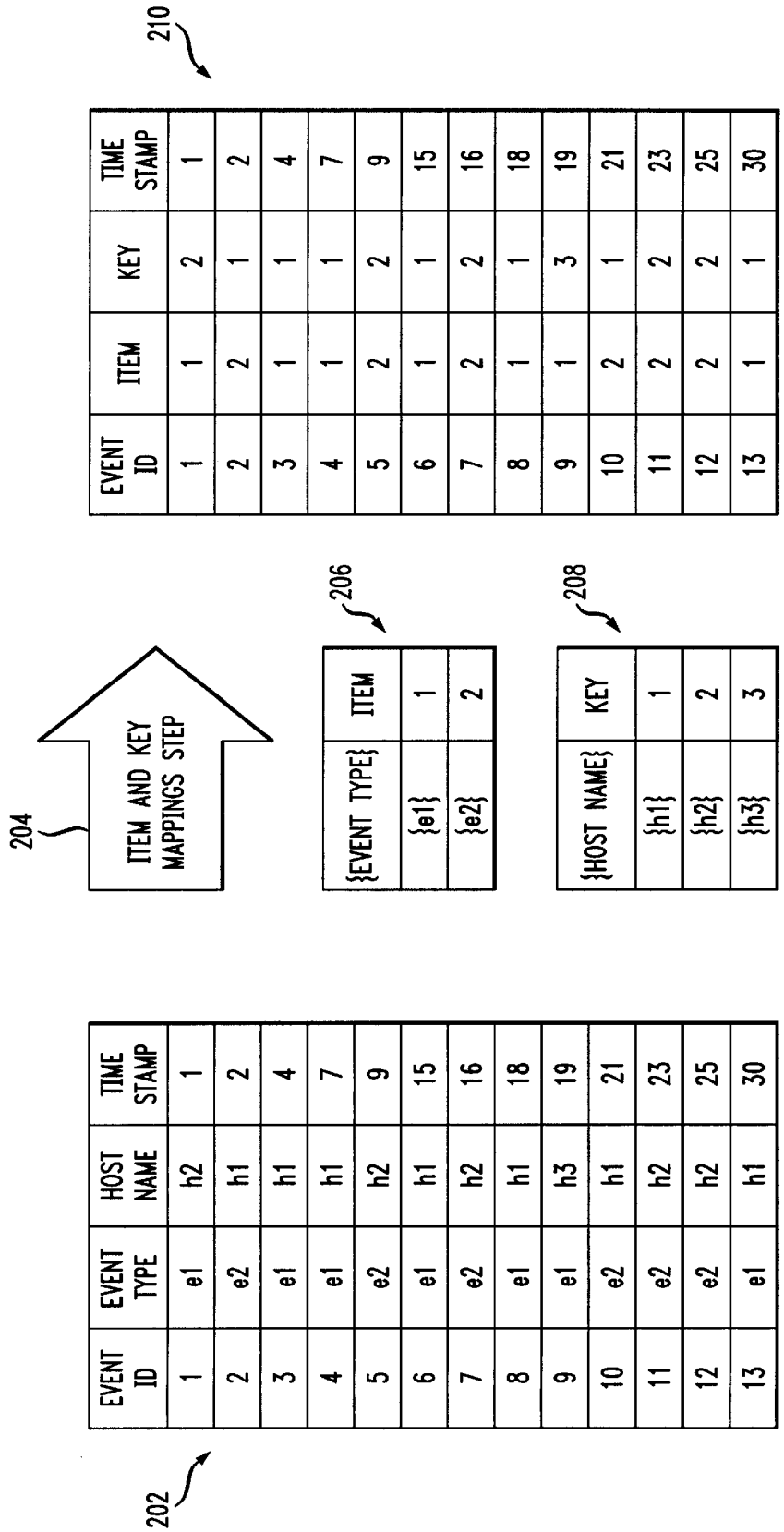
FIG. 2 is a diagram illustrating an exemplary intra-host mapping in which one attribute is mapped to an item and another attribute is mapped to a key according to an embodiment of the present invention.

FIG. 2 is a diagram illustrating an exemplary intra-host mapping in which one attribute is mapped to an item and another attribute is mapped to a key according to an embodiment of the present invention. More particularly, FIG. 2 illustrates the second type of mappings in which an event type maps to an item and a host maps to a key. In this example, there are two item values; and three key values. Again, we assume that the window size w of a pattern is 2.

We can see that the first instance of a pairwise pattern comprising item set {1, 2} for key 1 contains the 3rd and 2nd events, i.e., event types e1 and e2 occur in host h1 within a window of 2 (in this case, time between the 2nd and 4th time stamps). We note that the 1st and 2nd events do not form a valid instance as these two events have different key values (i.e., host h2 which generated event ID 1 has a key of 2 and host h1 which generated event ID 2 has a key of 1). Also, the 2nd and 4th events do not form a valid instance as their time difference is 5 (i.e., difference between time stamp 2 and 7), thus being above w.

Clearly, the two types of patterns described in FIG. 1 and FIG. 2 are different. The second type of pattern characterizes a set of related event types within a host; while the first type allows for discovery of patterns of items corresponding to different host names and event type pairs.

In accordance with one embodiment of the invention, mapping original attributes to items and keys can be done by a hash table (e.g., tables 206 and 208) method that is described in the following steps:

(1) A user defines two sets of original attributes that are to be mapped to items and keys, respectively.

(2) Initialize item and key mapping hash tables.

(3) Read next data record.

(4) Check whether there are corresponding entries in the two hash tables.

(5) If no entry found, create a new entry in the hash table(s) and assign new value(s); otherwise, go to (3) until all events are processed.

Now, we discuss several illustrative statistical measurements that may be used in accordance with a pairwise pattern pat={a,b}, where a and b are items having the same key value and occur within a time window w. It is to be understood that statistical measurements, such as will be illustrated below, are used to measure the significance or "interestingness" of each of the pairwise patterns formed in the manner described above. The overall steps of the methodology will be described below in the context of an illustrative pairwise pattern mining system. Such illustrative measurements may include:

Count(a,b): The total occurrences of pat in data. This measures how often a and b appear together in a time window w.

Predictive power: Denoted by p(a|b) and p(b|a). That is, this is a measure of how likely it is that one item occurs when we know that the other one occurs, also known as conditional probability. Here, we have two directions: p(a|b), the probability that a occurs within time window w of b; and p(b|a), the probability that b occurs within time window w of a. P(a|b) can be computed by p(a|b)=count(a,b)/count(a). A pattern that has a high predictive power indicates some causality or temporal relationship between a and b. Such a pattern can have a significant practical value in terms of prediction. For example, say b is an important alarm and p(b|a) is high. Then, event a can be used as a predictor for b.

Mutual dependence: Mutual dependence, or pm, indicates how strongly a and b relate with each other, i.e., when one of the two items occurs, how likely is it that the other one will occur within time window w. Thus, pm(a,b) is defined by:

$$pm(a,b)=min(p(a|b),p(b|a)).$$

Correlation score: A correlation score, or Corr, characterizes the correlation between a and b; the higher the score, the stronger that a and b are correlated. Corr(a,b) is defined as:

$$Corr(a,b)=count(a,b)/\{count(a)*count(b)\}.$$

Chi-squared score: A chi-squared score, or kscore, measures a level of how much a pairwise pattern deviates from the situation that a and b randomly and independently occur. The chi-squared score also associates to a confidence level. For example, a kscore=3.84 corresponding to 95% confidence that indicates how likely it is that a and b do not occur randomly. Kscore can be computed by:

$$Kscore=(p(a,b)-p(a)p(b))^2/\{p(a)p(b)(1-p(a)p(b))\},$$

where p(a,b), the probability of a and b occurring in time window w, can be computed by p(a,b)=count(a,b)*w/T, where T is the total observation time. The term p(a) is the probability of a occurring in time window w; and p(a)=count (a)*w/T. Similarly, we can compute p(b).

First, we note that all above measurements can be computed from the counts of {a, b}, a, and b in time window w. It is preferred that a correct and unambiguous count of a pattern be generated. While other ways of attempting to ensure this may be employed, one preferred way is described in the U.S. patent application identified as Ser. No. 09/860, 154 filed on May 17, 2001 and entitled "Systems and Methods for Identifying and Counting Temporal Patterns," the disclosure of which is incorporated by reference herein.

Second, a basic qualification function can be constructed based on the requirement that a measurement is above a predefined threshold. Further, in accordance with the present invention, a more sophisticated or composite qualification function can be made up of Boolean operations of the basic qualification functions.

By way of one example, we may be interested in all frequent patterns that are not formed randomly. This can be described by a pattern whose count is above a threshold and whose kscore is above a threshold. Such a combination of measures (a count and a chi-squared score) is one example of a composite qualification function. By way of another example, we may be interested in patterns that occur at least twice and have a high predictive power. Such a combination of measures (a count and a predictive power value) is another example of a composite qualification function. It is to be appreciated that these are only examples of significance measurement combinations that the invention employs to determine significant pairwise patterns. Thus, other measures and combinations thereof may be employed depending on the particular application.

Now, we describe an illustrative system for mining significant pairwise patterns according to the present invention. Specifically, FIG. 3 is a block diagram of a system architecture for mining pairwise patterns according to an embodiment of the present invention.

Figure 3:
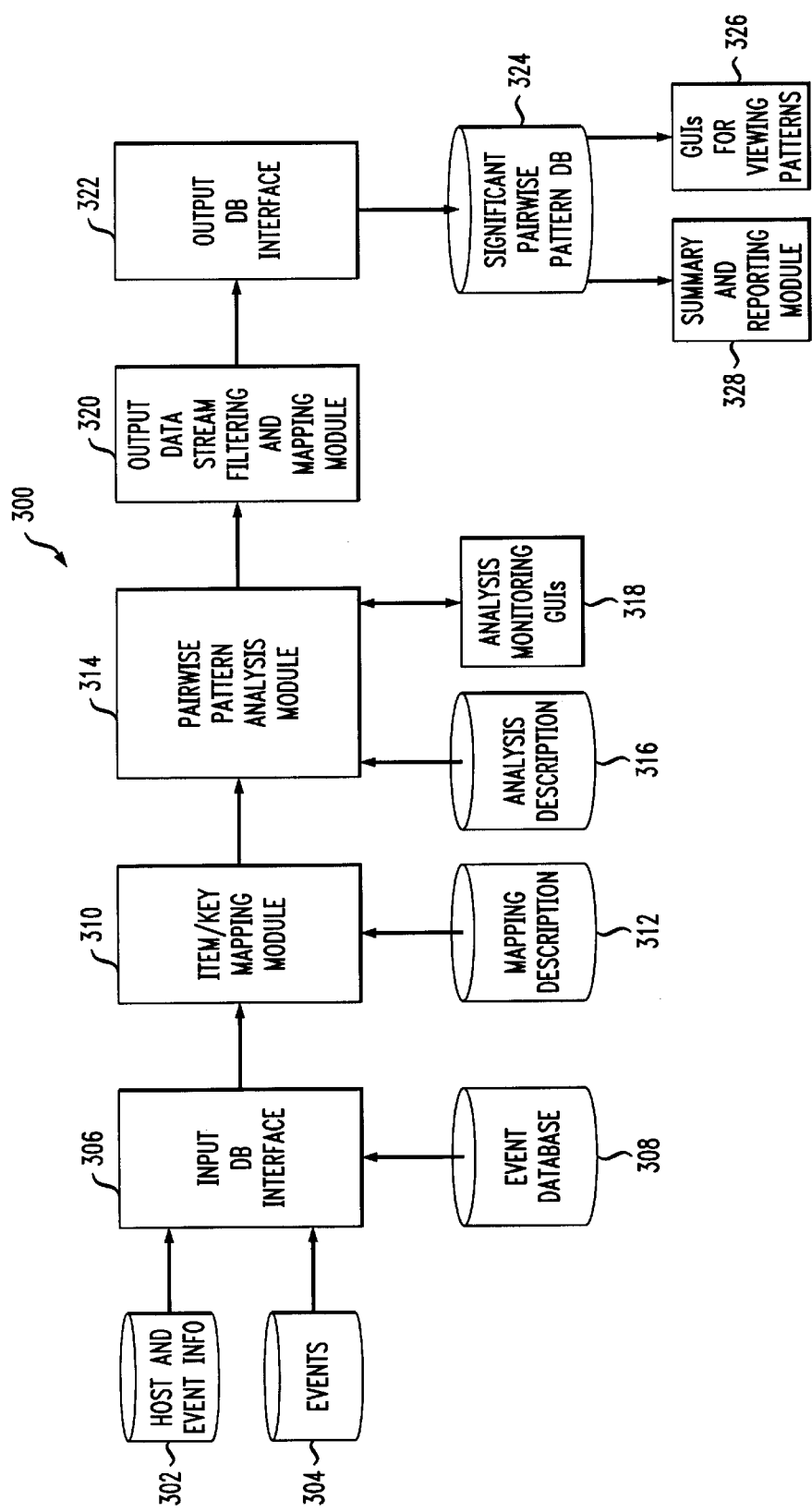
FIG. 3 is a block diagram of a system architecture for mining pairwise patterns according to an embodiment of the present invention.

As shown in FIG. 3, the overall system 300 comprises host and event information 302, event data 304, an input database (DB) interface 306, an event database 308, an item/key mapping module 310, a mapping description 312, a pairwise pattern analysis module 314, an analysis description 316, analysis monitoring graphical user interfaces (GUIs) 318, output data stream filtering and mapping module 320, an output DB interface 322, a significant pairwise pattern DB 324, GUIs for viewing patterns 326, and a summary and reporting module 328. The interaction of the system components will now be described.

Event data is often stored in a database as two types of information. One type of information is static and comprises, for example, information related to a host (e.g., the operating system running on a host, an application the host supports, location, etc.) or an event type (e.g., severity of event, source of event, etc.). This information usually does not change with time. Such information is denoted as 302 in FIG. 3. The other type of information is dynamic and comprises tabular information recording events with time stamps. Such information is denoted as 304 in FIG. 3.

The mining system 300 of the invention handles such data through the input database interface module 306. The interface module 306 inputs the data 302 and 304 for storage in the event database 308. The interface module 306 also forms Structured Query Language (SQL) queries to retrieve relevant information, possibly requested by a user, and also provides the ability to sequentially scan events from the database.

Item/key mapping module 310 provides the mapping functions that map original attributes of an event to items and keys based on the mapping description 312. It is to be understood that the mapping description is provided by the user and may be stored in the form of translation or hash tables such as are illustrated as 206 and 208 in FIG. 2. Thus, table 202 is representative of the data stored in database 308. After the mapping operations (step 204) are performed by the mapping module 310, the output data is in the form shown in table 210.

From the output table of the mapping module 310 (i.e., after the mapping module translates original events into items and keys), pairwise patterns are formed as sets of items that have the same key value and occur within a predetermined time window w. This is preferably done in the pairwise pattern analysis module 314. For example, as illustrated above in FIG. 2, an instance of a pairwise pattern is formed as item set {1, 2} for key 1, denoting that event types e1 and e2 occur in host h1 within a window size of 2. As previously explained, all such pairwise patterns are preferably formed in the same way.

Next, the pairwise pattern analysis module 314 examines each pairwise pattern and finds qualified patterns based on significance measurements that are defined by the analysis description file 316. It is to be understood that these measurements and the thresholds that they must surpass so that a pattern under consideration is labeled as significant or interesting are preferably provided by a user and stored in 316. As previously mentioned, the significance measures may be combined to form a sophisticated or composite qualification function. For example, a count score and a chi-squared score may be combined in accordance with a Boolean operator to form the composite qualification function. However, other individual measures and combinations thereof may be employed depending on the particular application.

Analysis monitoring GUIs 318 permit a user to monitor the progress of the mining process. Output data stream filtering and mapping module 320 saves the qualified pairwise patterns determined in accordance with the analysis module 314 into pattern database 324 through the output database interface module 322. Module 320 may also provide additional filtering and mapping (or formatting) functions on the data before providing the data to the pattern database 324. The significant pairwise patterns stored in the pattern database 324 can be further visualized in accordance with pattern viewing GUIs 326 and/or be further processed and summarized by summary and reporting module 328.

Figure 4:
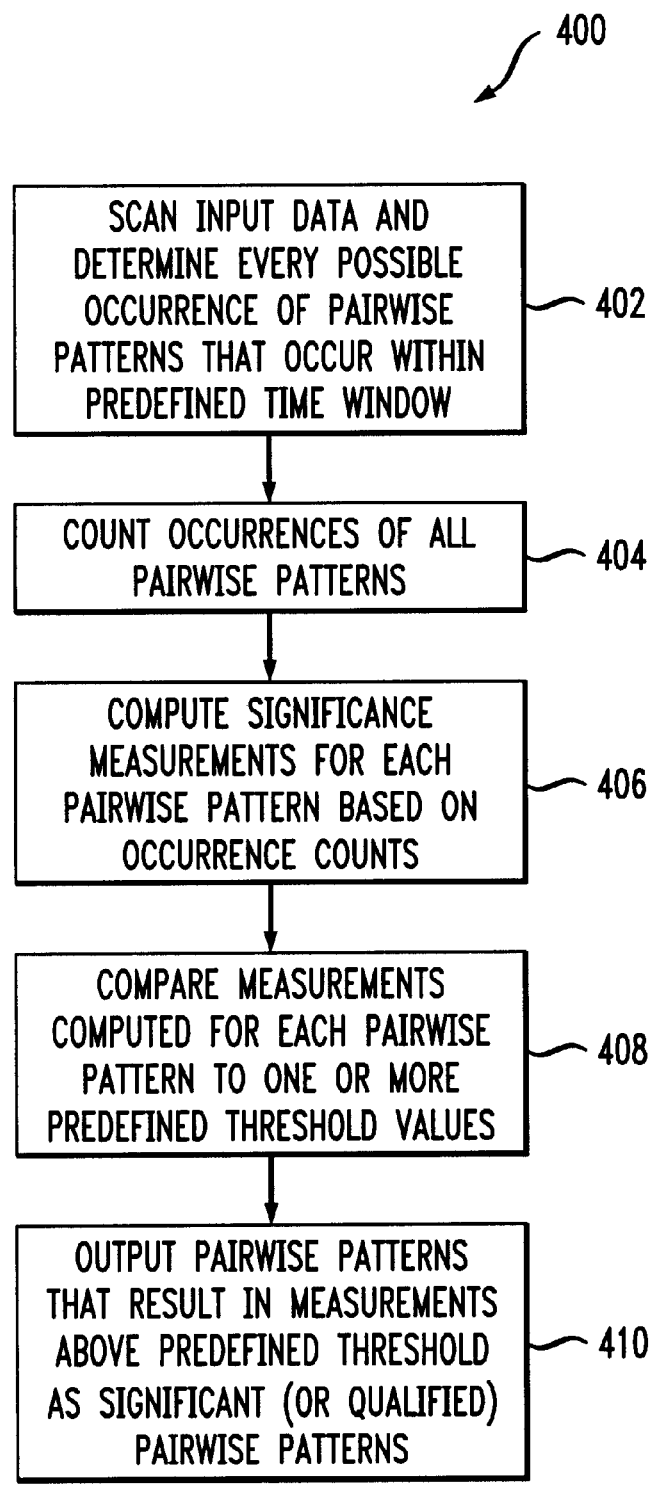
FIG. 4 is a flow diagram illustrating an algorithm for performing two item analysis according to an embodiment of the present invention.

Turning now to FIG. 4, a flow diagram illustrates an illustrative algorithm for performing two-item or pairwise analysis according to an embodiment of the present invention. It is to be appreciated that this algorithm is one example of an algorithm that may be performed in accordance with the item/key mapping module 310 and the pairwise pattern analysis module 314 of FIG. 3.

In accordance with the algorithm 400 of FIG. 4, step 402 scans the input event data and determines every possible occurrence of pairwise patterns that occur within a predefined time window. This operation is explained in detail above. In step 404, the occurrences of all pairwise patterns are counted. Next, in step 406, the algorithm computes one or more significance measurements (also cumulatively referred to herein as a qualification function or interestingness measurement) for each pairwise pattern based on the occurrence counts. By way of example, the qualification function may include a combination of the occurrence count and a predictive power measure (which itself is computed from the occurrence counts). Next, in step 408 for each pairwise pattern, the measurements (or composite function) are compared to one or more predefined threshold values.

Lastly, in step 410, the algorithm outputs pairwise patterns that result in measurements above the one or more predefined threshold values as significant or qualified pairwise patterns. As mentioned above, while these qualified patterns, themselves, provide valuable event management information to a system user or analyst, the patterns may be further processed and/or manipulated to provide even more information.

FIG. 5 is a diagram illustrating a database description in XML format according to an embodiment of the present invention. More particularly, FIG. 5 illustrates portions of description files that may be used and/or stored as part of the event database 308 in FIG. 3. As shown, the database description contains two types of information: (1) database access information 502 such as the database name, a user name, and an optional password; and (2) data access information 504 in the form of the SQL.

FIG. 6 is a diagram illustrating a mapping and analysis description in XML format according to an embodiment of the present invention. More particularly, FIG. 6 illustrates respective portions of description files that may be used and/or stored as part of the mapping description 312 and the analysis description 316 in FIG. 3. The mapping description 602 contains lists of data attributes that are used to map to items and keys, respectively. The item field can not be empty; whereas, the key field can be empty. The analysis description 604 contains the user-defined thresholds for one or more significance measurements that were previously described. The mining system of the invention supports both batch and interactive modes. The batch mode uses default values. The system can be scheduled to run on a regular basis. The interactive mode allows a user to override parameter values to those between the defined minimum and maximum values during an execution.

FIG. 7 is a diagram illustrating a pattern schema according to an embodiment of the present invention. More particularly, FIG. 7 illustrates a preferred format for storing qualified patterns in database tables. By way of example, the format shown in FIG. 7 may be the format employed to store the pairwise patterns in database 324 of FIG. 3.

Now we describe how to visualize and summarize qualified pairwise patterns, and how to merge the pairwise patterns into high order patterns. As will be recalled, these operations may be performed in accordance with the GUIs 326 and module 328 of FIG. 3.

Figure 8:
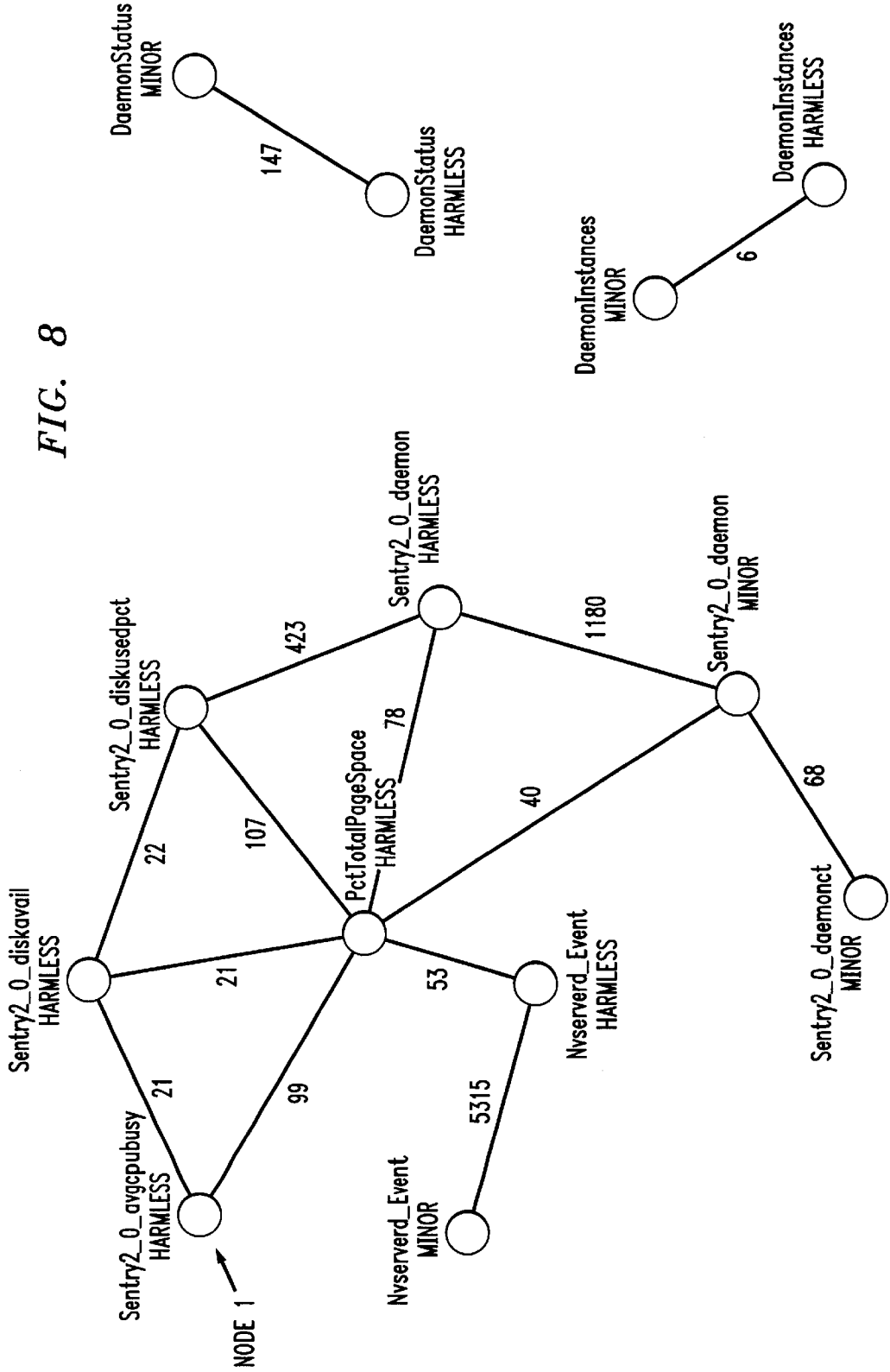
FIG. 8 is a diagram illustrating a visualization of pairwise patterns according to an embodiment of the present invention.

FIG. 8 is a diagram illustrating a visualization of pairwise patterns according to an embodiment of the present invention. More particularly, FIG. 8 provides an illustrative example that visualizes pairwise patterns. In the figure, a node (i.e., a circle) represents an item, whose corresponding value is labeled on the right-hand side of the node. For example, node 1 represents an event whose type is "Sentry2_0_avgcpubusy" and whose severity is "HARMLESS." A link between two nodes indicates that the corresponding two end nodes form a significant pairwise pattern. One significance measurement, in this case, is labeled along the link. In general, we can use other visual features to encode more significance measurements. For example, the color and the thickness of a link can be used to encode other significance measurements such as predictive power, Kscore, or Corr. Also, the visual features of a node, such as its color and shape, can be used to encode some measurements of an item such as the count of an item.

An illustrative method for visualizing pairwise patterns can be described by the following steps:

(1) Draw an item as a node in the graph.

(2) Use link to represent that the two end nodes form a significant pairwise pattern.

(3) The arrow of the link can be used to represent either temporal order or the predictive strength direction of the two nodes.

(4) Use other visual attributes, such as color and thickness, to represent some measurements.

(5) Use scrollable bars to represent the thresholds of measurements.

(6) A user can thus define thresholds on-the-fly by scrolling the bars. Steps (1) to (4) render the visualization of patterns. User interactions can be provided by scroll bars in steps (5) and (6).

Qualified pairwise patterns can be viewed in a list table. FIG. 9 is a diagram illustrating a list of significant pairwise patterns according to an embodiment of the present invention. More particularly, FIG. 9 shows an example in which each row represents a pairwise pattern. The first two columns show the two items in each pattern. The rest of the columns correspond to different significance measurements previously described.

However, this simple approach may have some drawbacks, especially for representing a long pattern. First, we note that a long pattern results in many qualified 2-item or pairwise sets, to be precise, n*(n−1)/2 where n is the length of a long pattern. Second, the relationship of pairwise patterns is not shown. To resolve these two issues, the mining system of the invention may employ summarization techniques in two ways. First, the system can summarize pairwise patterns by their items. That is, all patterns having the same item are grouped into a group. FIG. 10 is a diagram illustrating such a simple summarization. The summarization has two layers. The first layer shows groups represented by the common item in patterns in the group. The first layer can be expanded to show all associated patterns. For example, rows 1 through 5 in FIG. 10 correspond to the expanded first group, in which rows 1 through 4 are the pairwise patterns in the first group whose common item is shown in row 5.

A second approach that can be used to summarize pairwise patterns is to merge patterns into higher order patterns. By doing so, a single k-item pattern effectively represents many pairwise qualified patterns. The invention provides two types of merging methods: (1) weak merging; and (2) strong merging. The weak merging method merges pairwise patterns into a long pattern whenever such pairwise patterns share at least one item. The algorithm is described as follows:

```
Input: pat: a set of qualified pairwise patterns
Output: pat': a set of patterns
Algorithm (weak merging)
    pat'={ };
    For each p in pat
        canMerge = false
        for each p' in pat'
            if p' and p have a common item
                p' = p union p'
                canMerge = true
                Break the for loop
            end if
        end for
        if canMerge = false
            add p into pat'
        end if
    end for
    return pat'
```

The input to this algorithm is a set of qualified pairwise patterns denoted as pat. The output is the set of merged patterns pat' whose length can be greater than two. As described above, the algorithm loops through each pairwise pattern in pat. For each pairwise pattern p, if p can be merged into a pattern p' in pat', p' and p are merged; otherwise p will be added into pat'. It is determined whether p can be merged into p' by checking whether the two patterns have at least one common item. FIG. 8 provides a visualization of this merging method, in which we can see three groups, each corresponding to a weakly merged pattern. Items in each group (or weakly merged pattern) are connected with each other either directly or indirectly; while items in different groups are not connected.

The strong merging algorithm requires that all pairwise patterns in a long pattern are significant pairwise patterns. This problem is essentially a maximal cliques problem, which is NP-complete. To efficiently solve it, the invention provides a greedy algorithm described as follows:

```
Input: pat: a set of qualified pairwise patterns
Output: pat': a set of patterns
Algorithm (greedy algorithm for strong merging)
Let q = pat;
Let pat' = {p}, where p is a random pattern in pat; remove p from pat.
While(pat is not empty) {
    Let p be any pattern in pat.
        If(p can be merged into a pattern p' in pat');
            Merge p into p', e.g. p' = p' union with p
        Otherwise
            Add p into pat'; and delete p from pat
        End if
}
Return pat'
```

The input to this algorithm is a set of qualified pairwise patterns denoted as pat. The output is the set of merged patterns whose length can be greater than two. The algorithm starts with setting q by pat. The algorithm then picks a random pairwise pattern p in pat, and removes p from pat. Then, the algorithm goes into a loop until all pairwise patterns in pat are merged or added into pat'. In each loop, it is first determined whether a pairwise pattern p can be merged to any pattern in pat'. Here, a pattern p can be merged into another pattern p', if and only if we can form qualified pairwise patterns for any item in p and any item in p'. If p can not be merged with any pattern in pat', p will be added into pat'.

Figure 11:
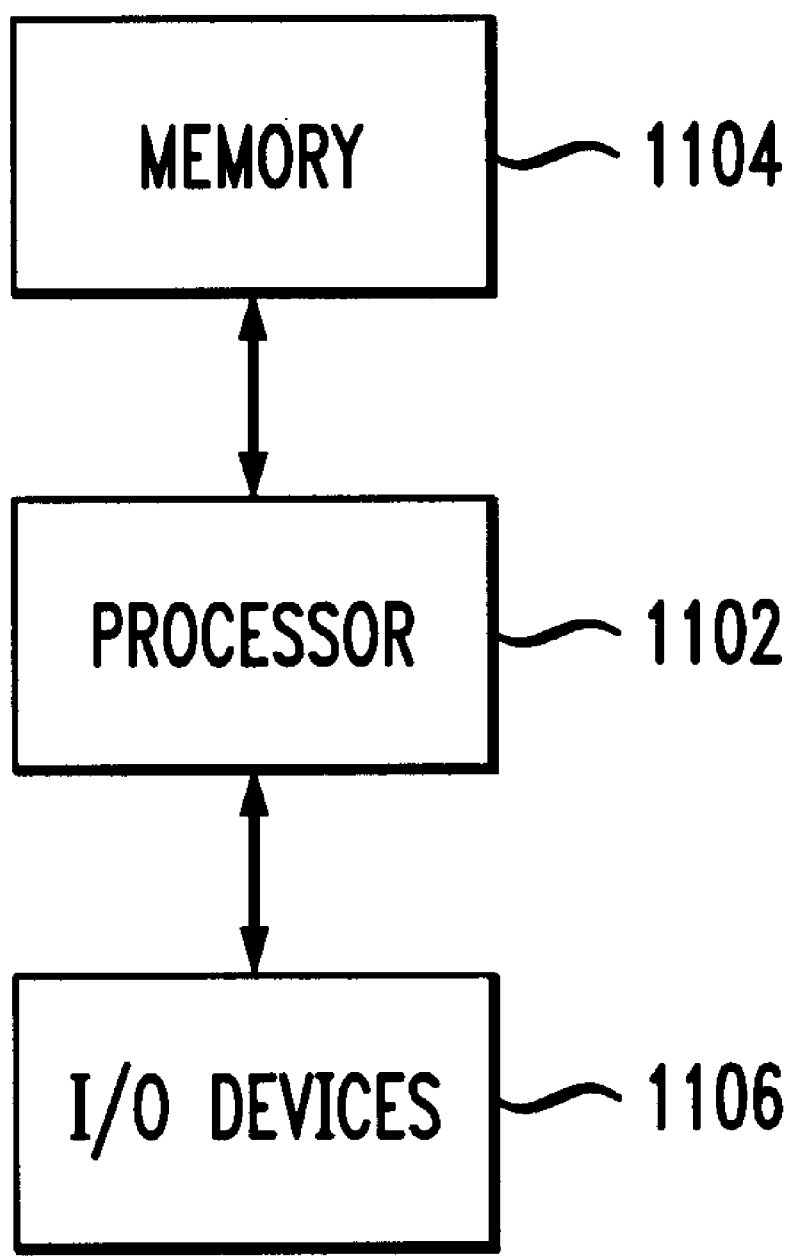
FIG. 11 is a block diagram illustrating a generalized hardware architecture of a computer system suitable for implementing a system for discovering pairwise patterns according to the present invention.

Referring now to FIG. 11, a block diagram is shown illustrating a generalized hardware architecture of a computer system suitable for implementing the various functional components/modules of a system for mining significant pairwise patterns as depicted in the figures and explained in detail herein. It is to be understood that the individual components of the pattern mining system, e.g., as illustrated in FIG. 3, may be implemented on one such computer system, or on more than one separate such computer system. Also, individual components of the system may be implemented on separate such computer systems. It is to be appreciated that the user may interact directly with the one or more computer systems implementing the pattern mining system 300. Alternatively, the user may employ a computer system in communication (e.g., via a remote or local network) with the one or more computer systems implementing the system 300 in order to interact with the system 300.

As shown, the computer system may be implemented in accordance with a processor 1102, a memory 1104 and I/O devices 1106. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data (e.g., user-specified mappings, significance measurements, thresholds, etc.) to the processing unit, and/or one or more output devices (e.g., CRT display, printer, etc.) for presenting results (e.g., view lists, pattern visualizations, etc.) associated with the processing unit. For example, system user interfaces employed by the user may be realized through such I/O devices. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

It is to be appreciated that the pairwise analysis techniques described herein may be employed in accordance with the off-line event management decision support system described in the U.S. patent application identified by U.S. patent application Ser. No. 09/976,540 filed concurrently herewith and entitled: "Systems and Methods for Providing Off-Line Decision Support for Correlation Analysis," and with the event relationship network validation, completion and construction system described in the U.S. patent application identified by attorney docket no. YOR920010748U.S. patent application Ser. No. 09/976,543 1filed concurrently herewith and entitled: "Systems and Methods for Validation, Completion and Construction of Event Relationship Networks," the disclosures of which are incorporated by reference herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-based method of mining one or more patterns in an input data set, the input data set being characterized by attributes, the method comprising the steps of:

mapping attributes of the input data set to mapping values; and forming one or more candidate patterns as groupings of two mapping values that occur within a predefined time period;

for each of the one or more candidate patterns:
computing a qualification function;
comparing a result of the qualification function with at least one predefined threshold value; and identifying the one or more candidate patterns whose qualification function results are one of greater than and equal to the at least one predefined threshold value as one or more qualified patterns.

2. The method of claim 1, wherein the mapping step comprises:

mapping attributes of at least two types associated with the input data set to item values; and forming one or more candidate patterns as groupings of two item values that occur within a predefined time period.

3. The method of claim 2, wherein the input data set comprises event data.

4. The method of claim 3, wherein the at least two attribute types are an event type and an event source identifier.

5. The method of claim 1, wherein the mapping step comprises:

mapping attributes of at least one type associated with the input data set to item values, and mapping attributes of at least another type associated with the input data set to key values; and forming one or more candidate patterns as groupings of two item values that are associated with the same key value and occur within a predefined time period.

6. The method of claim 5, wherein the input data set comprises event data.

7. The method of claim 6, wherein the at least one attribute type is an event type and the at least another attribute type is an event source identifier.

8. The method of claim 1, wherein the qualification function comprises one or more significance measurements.

9. The method of claim 8, wherein the one or more significance measurements comprise at least one of an occurrence count, a predictive power measure, a mutual dependence measure, a correlation score, and a chi-squared score.

10. The method of claim 1, wherein at least one of the mapping values, qualification function, and the threshold value are specified by a user.

11. The method of claim 1, further comprising the step of providing one or more visualizations of the one or more qualified patterns.

12. The method of claim 11, wherein the one or more visualizations comprise one or more graphical representations of the qualified patterns.

13. The method of claim 12, wherein a graphical representation of a qualified pattern comprises nodes representing one of the attributes of the input data set and a link connecting the nodes representing that the nodes form a qualified pattern.

14. The method of claim 13, wherein the link is visually encoded to represent the result of the qualification function.

15. The method of claim 1, wherein the node is visually encoded to represent a measure associated with a corresponding attribute of the input data set.

16. The method of claim 1, further comprising the step of summarizing qualified patterns to reveal multi-item relationships.

17. The method of claim 16, wherein the summarizing step comprises grouping qualified patterns having at least one identical mapping value into a group.

18. The method of claim 16, wherein the summarizing step comprises merging qualified patterns into one or more higher order patterns.

19. Apparatus for mining one or more patterns in an input data set, the input data set being characterized by attributes, the apparatus comprising:

at least one processor operative to: (i) map attributes of the input data set to mapping values; (ii) form one or more candidate patterns as groupings of two mapping values that occur within a predefined time period; (iii) for each of the one or more candidate patterns: compute a qualification function, and compare a result of the qualification function with at least one predefined threshold value; and (iv) identify the one or more candidate patterns whose qualification function results are one of greater than and equal to the at least one predefined threshold value as one or more qualified patterns; and a memory, coupled to the at least one processor, which stores at least one of the input data set and the one or more qualified patterns.

20. The apparatus of claim 19, wherein the mapping operation comprises:

mapping attributes of at least two types associated with the input data set to item values; and forming one or more candidate patterns as groupings of two item values that occur within a predefined time period.

21. The apparatus of claim 19, wherein the mapping operation comprises:

mapping attributes of at least one type associated with the input data set to item values, and mapping attributes of at least another type associated with the input data set to key values; and forming one or more candidate patterns as groupings of two item values that are associated with the same key value and occur within a predefined time period.

22. The apparatus of claim 19, wherein the qualification function comprises one or more significance measurements.

23. The apparatus of claim 19, wherein the at least one processor is further operative to provide one or more visualizations of the one or more qualified patterns.

24. The apparatus of claim 19, further comprising the step of summarizing qualified patterns to reveal multi-item relationships.

25. An article of manufacture for mining one or more patterns in an input data set, the input data set being characterized by attributes, the article comprising a machine readable medium containing one or more programs which when executed implement the steps of:

mapping attributes of the input data set to mapping values; and forming one or more candidate patterns as groupings of two mapping values that occur within a predefined time period;

for each of the one or more candidate patterns:
computing a qualification function;
comparing a result of the qualification function with at least one predefined threshold value; and identifying the one or more candidate patterns whose qualification function results are one of greater than and equal to the at least one predefined threshold value as one or more qualified patterns.

\* \* \* \* \*